United States Patent
Bing et al.

(10) Patent No.: US 11,080,576 B2
(45) Date of Patent: Aug. 3, 2021

(54) SYSTEM AND METHOD FOR TRACKING CLOTHES AND TEXTILE ARTICLES AND AN RFID READING CLOTHES DRYER

(71) Applicant: Cintas Corporate Services, Inc., Cincinnati, OH (US)

(72) Inventors: Richard R. Bing, West Chester, OH (US); Patrick J. Chilenski, Cleves, OH (US); David S. Mesko, Wyoming, OH (US)

(73) Assignee: Cintas Corporate Services, Inc., Cincinnati, OH (US)

( * ) Notice: Subject to any disclaimer, the term of this patent is extended or adjusted under 35 U.S.C. 154(b) by 20 days.

(21) Appl. No.: 16/595,768

(22) Filed: Oct. 8, 2019

(65) Prior Publication Data
US 2020/0125905 A1   Apr. 23, 2020

Related U.S. Application Data

(60) Provisional application No. 62/746,611, filed on Oct. 17, 2018.

(51) Int. Cl.
*G06K 17/00* (2006.01)
*D06F 93/00* (2006.01)
*H04W 4/80* (2018.01)

(52) U.S. Cl.
CPC ......... *G06K 17/0029* (2013.01); *D06F 93/00* (2013.01); *H04W 4/80* (2018.02)

(58) Field of Classification Search
CPC ... D06F 93/005; D06F 93/00; G06K 17/0029; H04W 4/80
See application file for complete search history.

(56) References Cited

U.S. PATENT DOCUMENTS

| 5,036,602 A | 8/1991 | Coffman |
| 5,923,011 A | 7/1999 | Sasaki et al. |

(Continued)

FOREIGN PATENT DOCUMENTS

| CN | 103726262 | 4/2014 |
| DE | 20016620 U1 | 1/2001 |

(Continued)

*Primary Examiner* — Ryan W Sherwin
(74) *Attorney, Agent, or Firm* — Wood Herron & Evans LLP (57) ABSTRACT

A system and method offer a garment provider the ability to automatically scan and track garments at multiple locations without adding processing stations. Various embodiments of this invention allow garment providers to achieve greater processing efficiencies and implement reporting and tracking protocols to provide customers with important data regarding garments in their program with a higher level of confidence. This invention is implemented in various embodiments with a system and/or method for tracking clothes and other textile articles utilizing multiple RFID reading modules throughout the system or method to achieve greater accuracy for reporting and tracking the items. One aspect of various embodiments of this invention is the reading of RFID tags on articles being dried in a commercial dryer. The movement of the articles induced by the action of the dryer provides for increased exposure of the RFID tags on the articles for more reliable detection.

20 Claims, 10 Drawing Sheets

(56) References Cited

U.S. PATENT DOCUMENTS

| | | |
|---|---|---|
| 6,663,004 B2 | 12/2003 | Wagner et al. |
| 6,998,541 B2 | 2/2006 | Morris et al. |
| 7,056,050 B2 | 6/2006 | Sacks |
| 7,431,524 B2 | 10/2008 | Sacks |
| 7,561,045 B2 | 7/2009 | Langlois et al. |
| 7,639,136 B1 | 12/2009 | Wass et al. |
| 7,649,462 B2 | 1/2010 | Ellis et al. |
| 7,680,691 B2 | 3/2010 | Kimball et al. |
| 7,876,220 B2 | 1/2011 | Aldridge |
| 7,886,458 B2 | 2/2011 | Blair |
| 7,990,272 B2 | 8/2011 | Wass et al. |
| 8,068,029 B2 | 11/2011 | Langlois et al. |
| 8,069,983 B2 | 12/2011 | Cross |
| 8,105,296 B2 | 1/2012 | Morris et al. |
| 8,229,801 B2 | 7/2012 | Eisenberg et al. |
| 9,428,337 B1 | 8/2016 | Powell et al. |
| 9,732,456 B2 | 8/2017 | Magnusson |
| 2004/0199545 A1 | 10/2004 | Wagner et al. |
| 2005/0183990 A1 | 8/2005 | Corbett |
| 2006/0232407 A1 | 10/2006 | Ballard |
| 2007/0261713 A1* | 11/2007 | Choi ................. D06F 34/28 134/18 |
| 2008/0051746 A1 | 2/2008 | Shen-Gunther |
| 2008/0074262 A1 | 3/2008 | Paulkovich |
| 2008/0116273 A1* | 5/2008 | Aldridge ............ D06F 93/00 235/439 |
| 2008/0157967 A1 | 7/2008 | Jones et al. |
| 2008/0283585 A1* | 11/2008 | Peterman ............ D06F 33/00 235/375 |
| 2009/0146811 A1* | 6/2009 | Burka ................. D06F 93/00 340/572.1 |
| 2009/0212910 A1 | 8/2009 | Schneider |
| 2010/0066497 A1 | 3/2010 | Lim et al. |
| 2010/0082457 A1 | 4/2010 | Eisenberg et al. |
| 2010/0179822 A1 | 7/2010 | Reppas |
| 2011/0126357 A1* | 6/2011 | Hartman ............. C11D 17/04 8/137 |
| 2011/0197463 A1 | 8/2011 | Shih |
| 2011/0304433 A1 | 12/2011 | Molewyk et al. |
| 2016/0091874 A1* | 3/2016 | Colett ................. D06F 93/00 235/385 |
| 2017/0241066 A1 | 8/2017 | Caspers |
| 2018/0142394 A1* | 5/2018 | DeBates .............. D06F 33/00 |

FOREIGN PATENT DOCUMENTS

| | | |
|---|---|---|
| DE | 102004052396 A1 | 7/2006 |
| EP | 1190663 B1 | 3/2002 |
| EP | 1528504 A9 | 4/2005 |
| JP | 2011015395 A | 1/2001 |
| JP | 2005131220 A | 5/2005 |
| WO | 2010097704 A1 | 2/2010 |

* cited by examiner

SYSTEM AND METHOD FOR TRACKING CLOTHES AND TEXTILE ARTICLES AND AN RFID READING CLOTHES DRYER

This claims the benefit of U.S. Provisional Patent Application Ser. No. 62/746,611, filed Oct. 17, 2018 and hereby incorporated by reference in its entirety.

BACKGROUND OF THE INVENTION

This invention relates, in general, to devices that enhance the productivity and safety associated with large volume garment processing (e.g., sorting, washing, drying, repair/replacement, storage and delivery), and more particularly to such improvements enabled by tracking individual garments by radio frequency identification (RFID) devices.

Commercial and industrial laundering facilities have become increasingly sophisticated to meet customer demand efficiently and economically. These facilities are generally large-scale operations capable of laundering and organizing thousands of garments per day. Tracking the garments laundered in such facilities is important.

Businesses provide garments and other supplies to their workers for several reasons. Such garments may include uniforms that are utilized to identify the worker as an employee of the company. Food-service workers, hospital personnel and automotive mechanics are a few examples of the types of employees who may be seen in uniform. The use of uniforms for employees may also contribute to the brand image of the employer by helping to present a positive and consistent impression to the public through its employees.

The uniforms and other garments are often obtained by businesses from a garment provider which in turn may also provide laundering services for the garments. In such an arrangement, the business customer may specify to the garment provider the number and type of garments, pick up dates, turnaround times and other parameters for service. The garment provider then delivers the garments to the customer for use by employees, picks up the soiled garments, processes and launders the garments and then returns the garments to the customer's location. Garment providers often provide for laundering and processing of items in addition to clothing and uniforms, including shop towels and floor mats as well as other items that require laundering or processing. One of ordinary skill will understand that the use of the terms "garment" or "textile article" as used herein is non-limiting and is, in proper context, understood to include clothing such as uniforms as well as towels, wipes, mats and other items that can be laundered or otherwise processed in the garment provider's facilities for the customer.

Costs in such a program are based on many factors including the number of garments in the program, the service volume for such garments, the level of service for the garments, charges for enhanced treatment of the serviced garments, charges for lost or damaged garments, and charges for new wearers entering the program. Invoices for these services that are accurate and reflect what services have been performed are important to both the customer and garment provider.

A garment provider and a customer may disagree when a garment or other item is reported missing or damaged, whether such is discovered by the customer or reported to the customer by the garment provider. The dispute may be whether the item has been lost or damaged within the customer's organization or during servicing by the garment provider. Service contracts often allocate the replacement or repair cost of the garment to whoever lost or damaged the garment. The resolution of such disputes can be better resolved with information on the location of the garment and its condition that is available to both sides. Transparency and accurate, real-time information provided to both sides is important. However, such information is often unavailable or obscured by a lack of records on what has been delivered, what was turned in at the customer's site, how it is used, and the condition of the garment.

Industrial garments are often handled in random bundles when they are soiled and to be returned to the industrial laundry for cleaning. These bundles are most often managed in bulk since dealing with the garments on an individual basis is very labor intensive. After arriving at the laundry facility, the laundry is typically separated in types dependent of what should be washed together. Some separation of different delivery routes and accounts may occur from sequential unloading of the route trucks, and by design, to separate route lots in the laundry process. Garments are normally manually arranged and bundled after completing the drying process.

Complete manual identification of each garment at the laundry facility entry is cost prohibitive. Therefore, garment provider processes currently include identifiers on garments for manual and automatic tracking. RFID tags have been used in some industrial laundry plants.

However, these approaches often result in unacceptable labor costs. For barcode implementations, readers require line of sight between reader and the identifier. RFID tags tend to require special machines to be used to separate garments in front of the reader due to their limited capability to quickly read many tags in front of the reader at the same time. It also may require manual labor to feed the separation machine. Added processing stations for RFID reading add time, cost and inefficiency to the laundry processing. Moreover, a single RFID reading location is typically less than completely accurate and does not provide adequate tracking of the garments through the laundry processing.

A system that offers a garment provider the ability to automatically scan and track garments at multiple locations without adding processing stations and even the ability to identify individual garments within bundles of clean or soiled garments would allow garment providers to achieve greater processing efficiencies and implement reporting and tracking protocols to provide customers with important data regarding garments in their program with a higher level of confidence.

SUMMARY OF THE INVENTION

This invention solves the above-identified and other shortcomings in the prior art by providing a system that offers a garment provider the ability to automatically scan and track garments at multiple locations without adding processing stations and even the ability to identify individual garments within bundles of clean or soiled garments. Various embodiments of this invention allow garment providers to achieve greater processing efficiencies and implement reporting and tracking protocols to provide customers with important data regarding garments in their program with a higher level of confidence.

This invention is implemented in various embodiments with a system and/or method for tracking garments, including but not limited to clothes and other textile articles, utilizing multiple RFID reading modules throughout the system or method to achieve greater accuracy for reporting and tracking the items. One aspect of various embodiments of this invention is the reading of RFID tags on articles being dried or processed in a commercial dryer. An RFID reading module may be added to the dryer as a retrofit addition or provided with the dryer as original equipment according to embodiments of this invention. The movement of the articles induced by the action of the dryer provides for increased exposure of the RFID tags on the garments for more reliable reading of the RFID tags by the RFID reading module. The ability to read the RFID tags throughout the drying process provides for very reliable and comprehensive coverage. The ability to read the RFID tags in the dryer coupled with additional RFID reading points throughout the garment processing offers a garment provider the ability to automatically scan and track garments at multiple locations without adding processing stations and even the ability to identify individual garments within bundles of clean or soiled garments. Greater processing efficiencies and reporting and tracking protocols provide customers with important data regarding garments in their program with a higher level of confidence.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1:
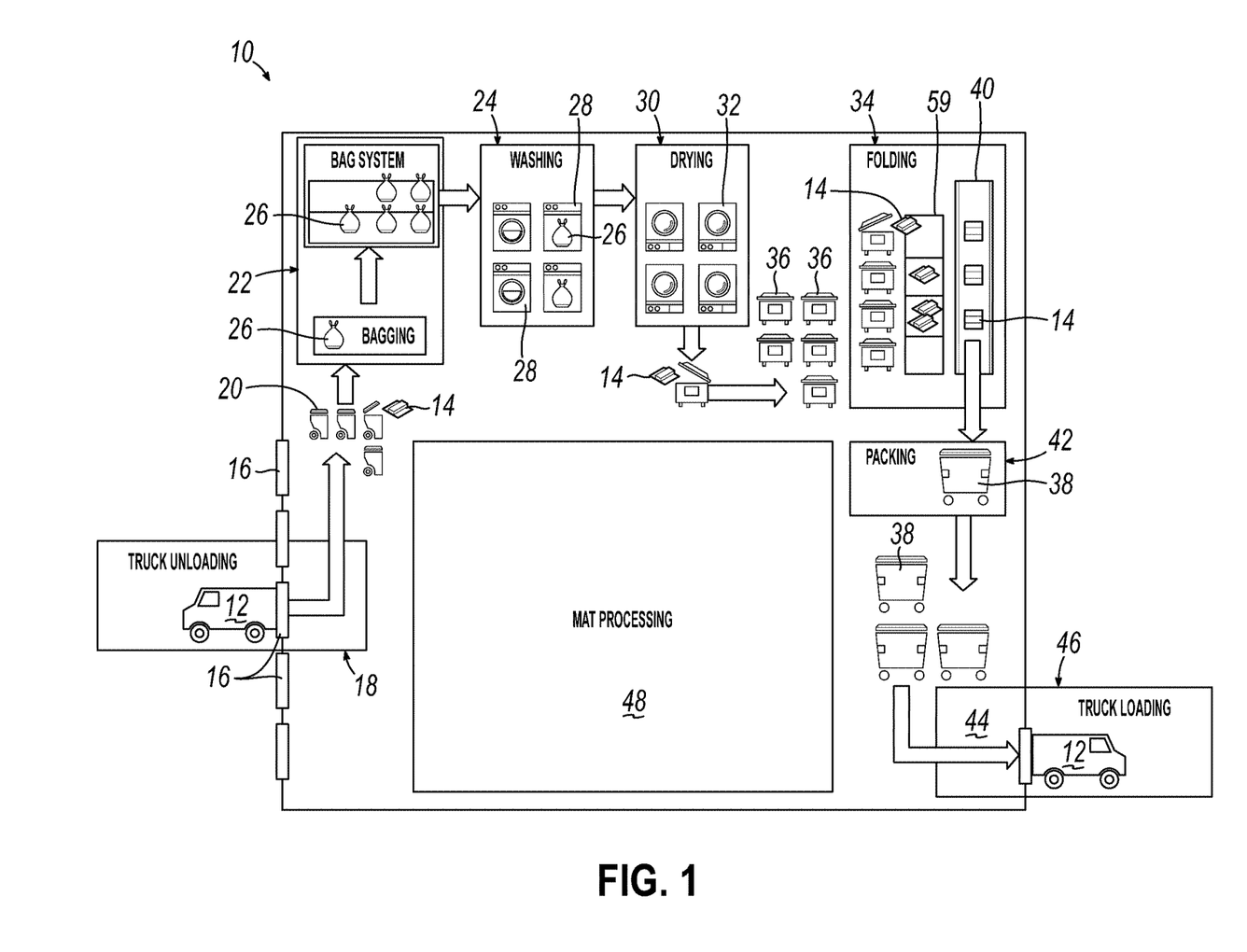
FIG. 1 is a schematic view of one embodiment of a system for processing and tracking garments according to this invention.

Referring to FIG. 1, a schematic view of one embodiment of a system 10 for processing and tracking laundry according to this invention is shown. Initially, the system 10 includes, and the method begins with service trucks 12 unloading soiled and dirty garments or textile articles 14 to be cleaned at one of several bays 16 at an unloading dock 18 or receiving station of the system. The soiled garments 14 may be contained or placed in wheeled totes 20 for transport from the unloading dock 18 to a bagging or sorting station 22 at which the soiled garments 14 are sorted, collected and/or bagged for processing in the facility. The bagging station 22 may utilize the process and system as disclosed in U.S. Pat. No. 8,691,257 assigned to the assignee of this invention and hereby incorporated by reference in its entirety. The bagging system also may utilize the invention disclosed in U.S. Patent Application No. 62/594,619 filed Dec. 5, 2017 entitled Reusable Laundry Bag and hereby incorporated by reference in its entirety. After the soiled garments 14 are bagged at the bagging station 22, they are processed to a washing station 24 in which each bag 26 is placed within a washing machine 28 to clean the soiled garments 14 within the bag 26.

After the bags 26 and garments 14 contained therein are processed at the washing station 24, they are advanced to a drying station 30 in which the garments 14 are placed into industrial dryers 32 for drying. The garments 14 are then removed from the dryers 32 at the drying station 30 and processed to a folding station 34. The garments 14 may or may not continue to be contained within the bags 26 and wheeled bins 36 may be used for advancing the garments 14 from the drying station 30 to the folding station 34.

The garments 14 are folded at the folding station 34 and placed on a conveyor 40 and advanced to a packing station 42 at which the folded and cleaned garments 14 are bundled into packs 38. They are then advanced to a loading or dispatch station 44 at which the garments 14 are loaded onto a service truck 12 at a loading dock 46 for delivery to a customer or user of the garments 14. The facility may include additional functions such as a floor mat processing area 48 or other such areas.

Figure 2:
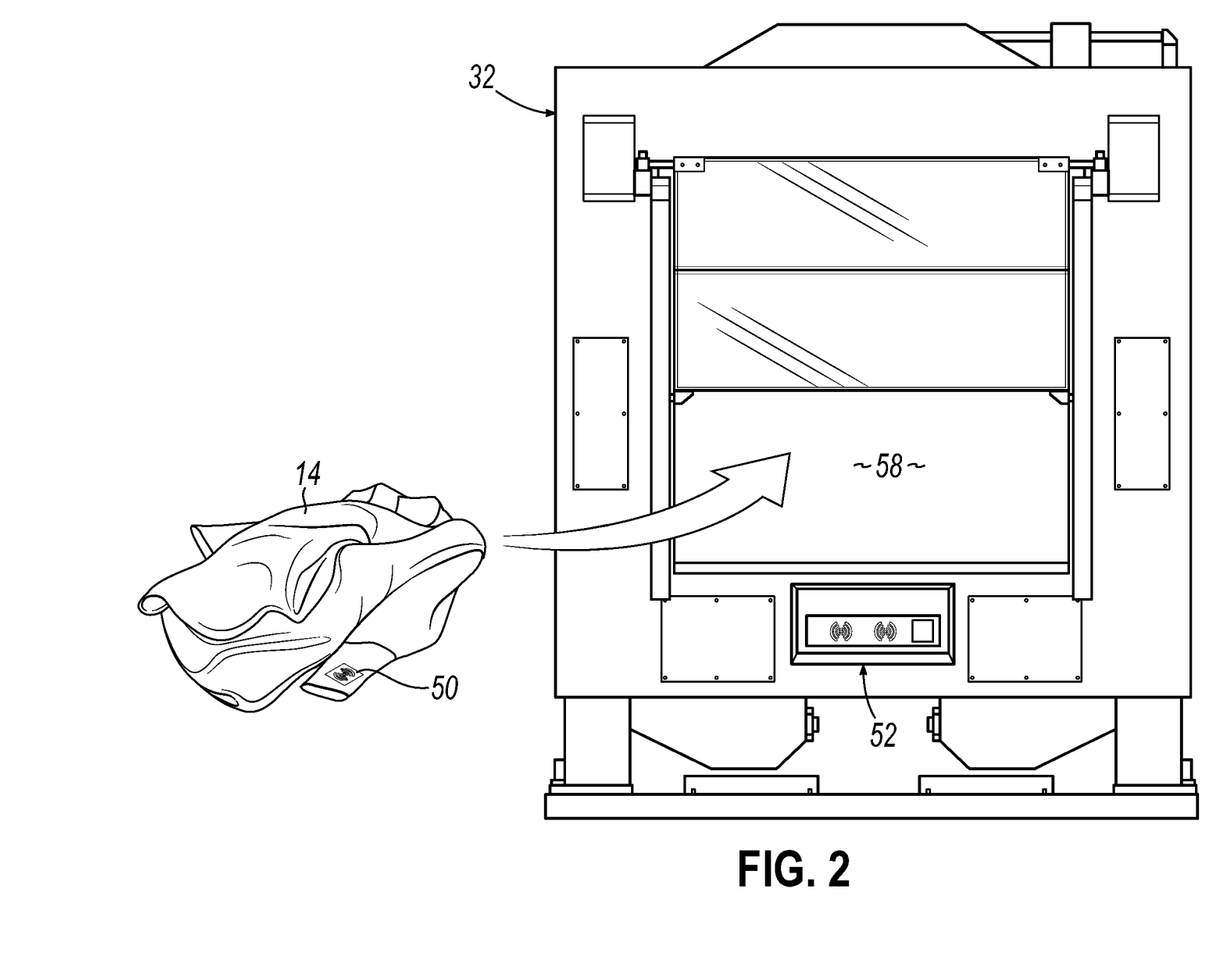
FIG. 2 is a view of a dryer with an RFID reader mounted thereon for reading RFID tags on garments being dried in the dryer according to one aspect of this invention.

The individual garments 14 are each tagged with an identifier such as an RFID tag, chip 50 or the like (see FIG. 2). The system 10 includes various locations or stations throughout for reading the individual tags 50 on the garments 14 and tracking the movement of the garments 14 through the system 10. It has been found that utilizing multiple locations throughout the system to read the RFID tags 50 provides increased reliability and efficiencies for reporting and tracking the garments 14. Referring to FIG. 2, one location for reading the RFID tags 50 on the individual garments according to various aspects of this invention is each of the individual dryers 32 at the drying station 30. An RFID reader 52 is mounted to a housing containing a drying chamber of the dryer 32 as shown in FIG. 2. The movement of the garments 14 within the dryer 32 enhances the ability of the RFID reader on the dryer 32 to read the RFID tags 50 on the garments 14. In one embodiment, the RFID reader 52 is mounted to a non-moving or stationary part of the dryer 32 while the garments 14 are being dried.

Figure 3:
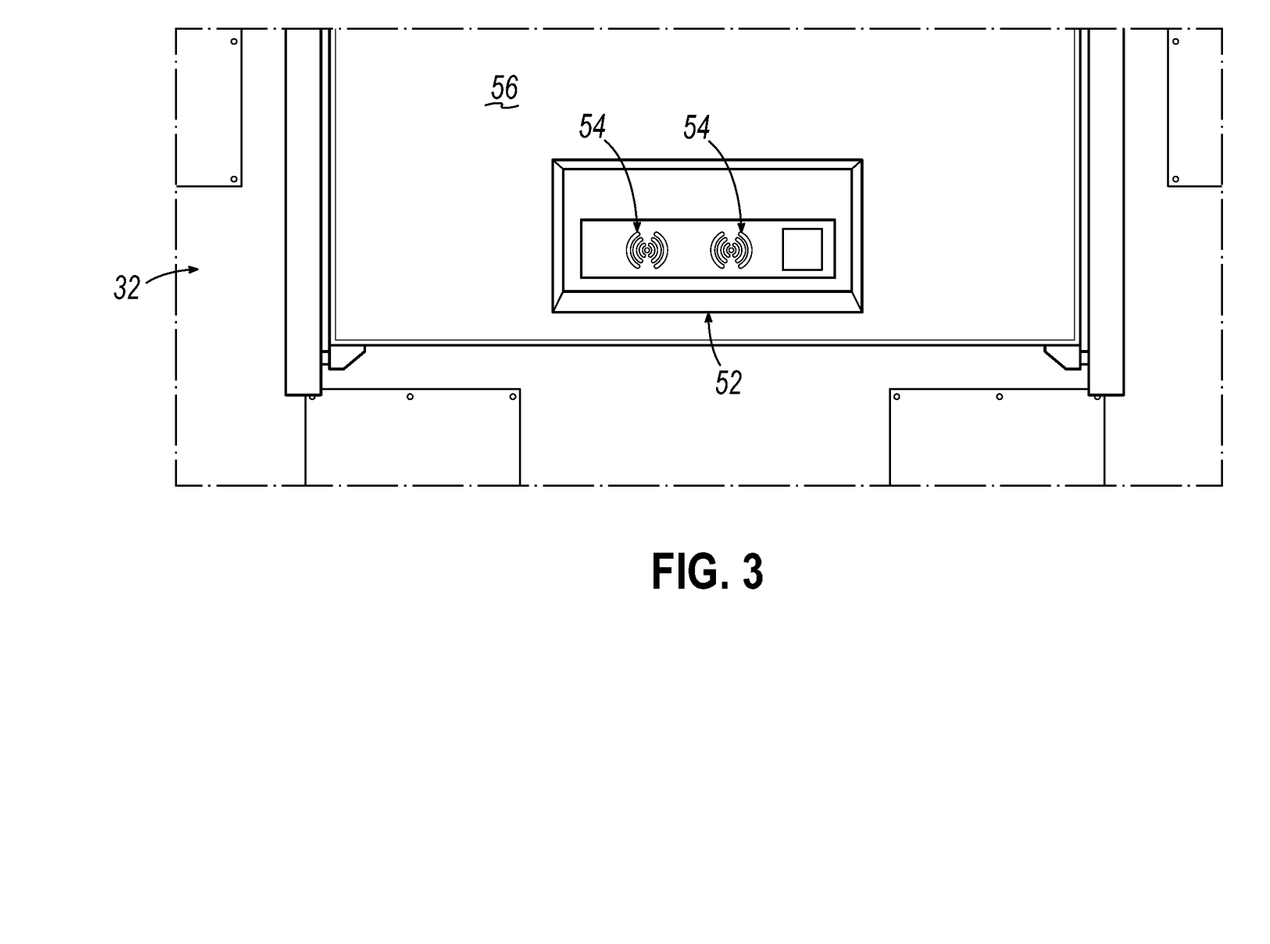
FIG. 3 is a view of a dryer with an RFID reader mounted thereon for reading RFID tags on garments being dried in the dryer according to another aspect of this invention.

As shown in FIG. 3, multiple antennas 54 may be connected to an RFID reader 52 and each affixed to a door 56 of the dryer 32 for reading the tags 50 on the garments 14 being dried within the dryer 32. In this regard, U.S. Pat. No. 7,876,220 owned by the assignee of this invention discloses a garment tracking and processing system which includes an RFID reader antenna mounted on a non-rotating surface of a dryer door to detect RFID tags located anywhere within the interior or drying chamber of the dryer drum. U.S. Pat. No. 7,876,220 is hereby incorporated by reference in its entirety.

Figure 4:
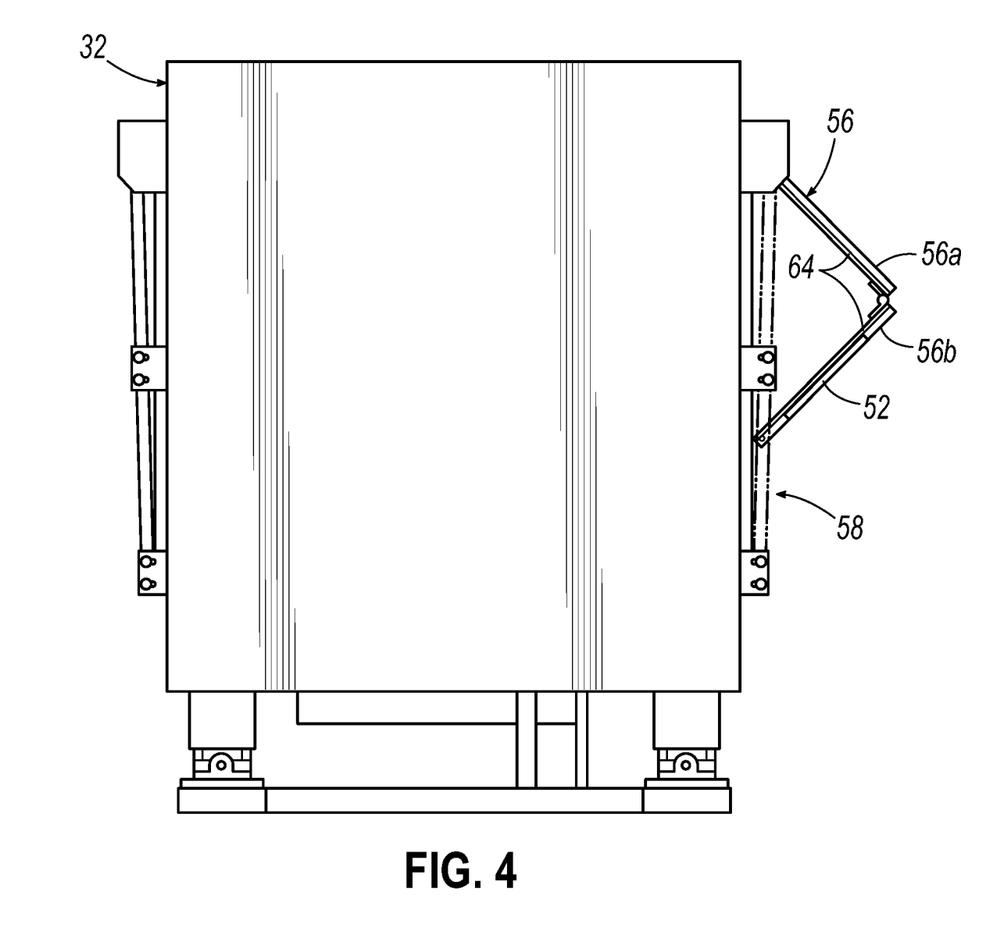
FIG. 4 is a side elevational view of a dryer with an RFID reader mounted thereon for reading RFID tags on garments being dried in the dryer according to a still further aspect of this invention.
Figure 5:
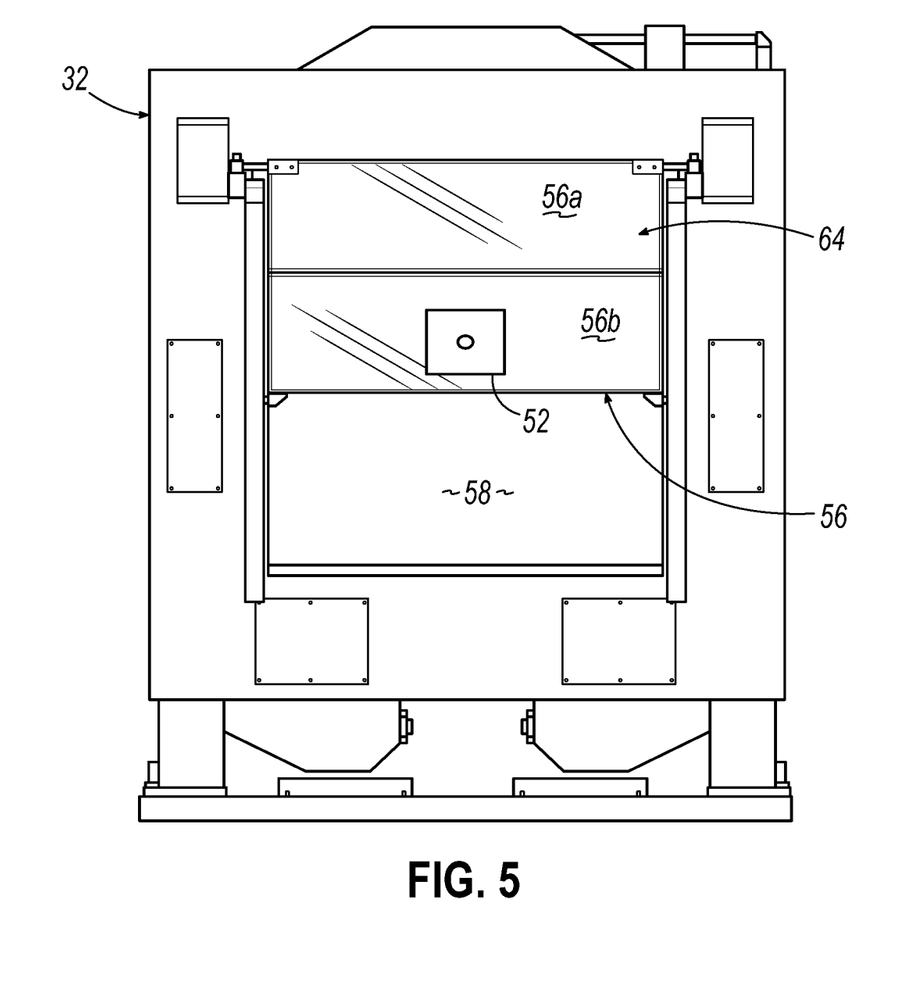
FIG. 5 is a front elevational view of the dryer of FIG. 4.

Referring to FIGS. 4 and 5, side and front elevational views of an exemplary dryer 32 on which an RFID reader 52 is mounted are shown. It will be appreciated by one of ordinary skill in the art that the specific dryers and drying machines shown and described herein are exemplary only and aspects of this invention may be employed with any appropriate dryer or drying machine. For example, one type of industrial dryer 32 which may be utilized with this invention is available from G.A. Braun, Inc. of North Syracuse, N.Y., www.gabraun.com. The dryer 32 shown in FIGS. 4 and 5 has a door 56 movable between closed and open positions. In one embodiment, the RFID reader 52 is mounted to a non-opaque portion of the dryer 32 or the dryer door 56 so as to allow the reader 52 to interrogate the RFID tags 50 within the drying chamber during the drying cycle. The particular door 56 design of the dryer 32 shown in FIGS. 4 and 5 is hinged on the top edge of the door 56 and along the mid-line of the door 56 for collapsing the upper and lower halves 56a, 56b of the door 56 together in the open position. When the dryer door 56 is closed, it covers an opening or doorway 58 through which the garments 14 may be inserted into the dryer 32 for the drying process.

According to the embodiment shown in FIGS. 4 and 5 an RFID reading module 52 is mounted to the lower half 56b of the door 56 as shown particularly in FIG. 5. The RFID reading module 52 may be a retrofit addition to the dryer 32 or provided with the dryer 32 as original equipment according to various aspects of this invention.

Figure 6:
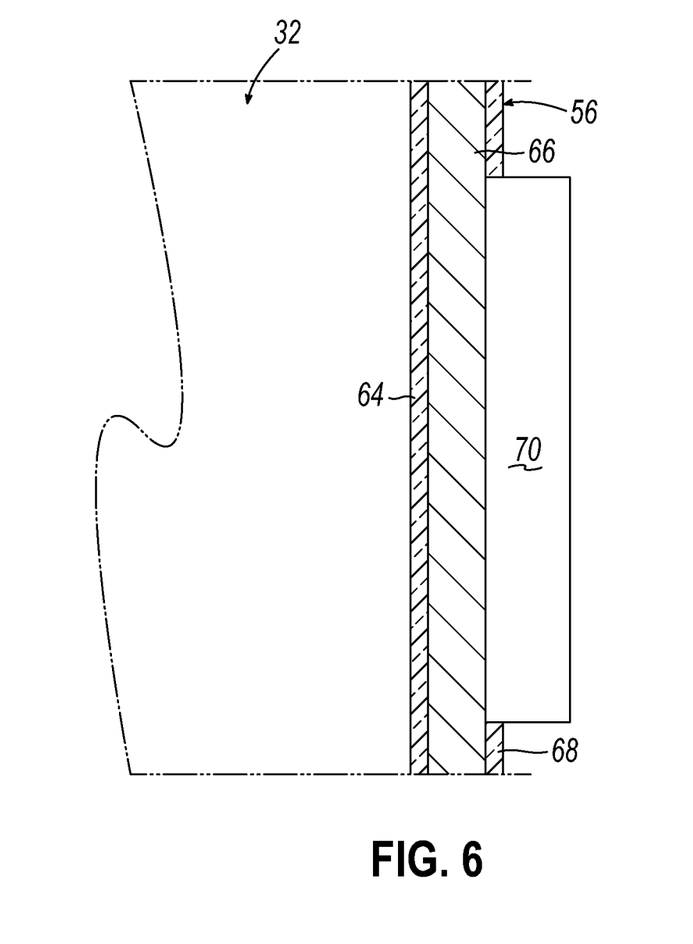
FIG. 6 is a side elevational view of a door on a dryer with an RFID antenna box mounted thereon according to one aspect of this invention.

A cross-sectional view of the dryer door 56 with an RFID reading module 52 mounted thereon is shown in FIG. 6 in which the inside of the dryer 32 is contained at least partially by a glass window 64 on the dryer door 56. The glass window 64 is separated by insulation 66 from another panel 68 of the dryer door 56 on which an RFID antenna box 70 is mounted and projecting toward the external environment of the dryer 32.

Figure 7A:
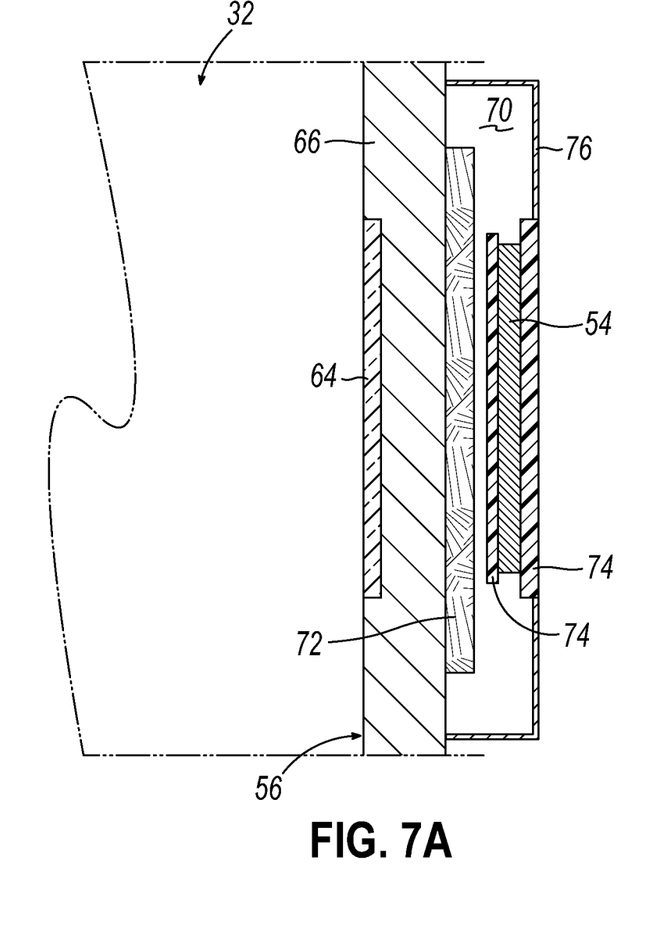
FIGS. 7A and 7B are a side elevational view and a front elevational view, respectively, of a door on a dryer with an RFID antenna box mounted thereon according to another aspect of this invention.

A further alternative embodiment of such an arrangement is shown in FIG. 7 in which the dryer door 56 closes an interior drying chamber or inside volume of the dryer 32. The dryer door 56 may be constructed of a glass window 64 having an adjacent insulation layer 66. An additional layer of insulation 72 for the RFID antenna 54 may be added to the dryer door insulation layer 66 and the antenna 54 and antenna frame 74 are mounted within the box 70 on the dryer door 56. An external structure of the box contains an RFID antenna box frame 76 and the RFID antenna 54 for reading RFID tags 50 on the garments 14 being dried and tumbled within the dryer 32.

Figure 8A:
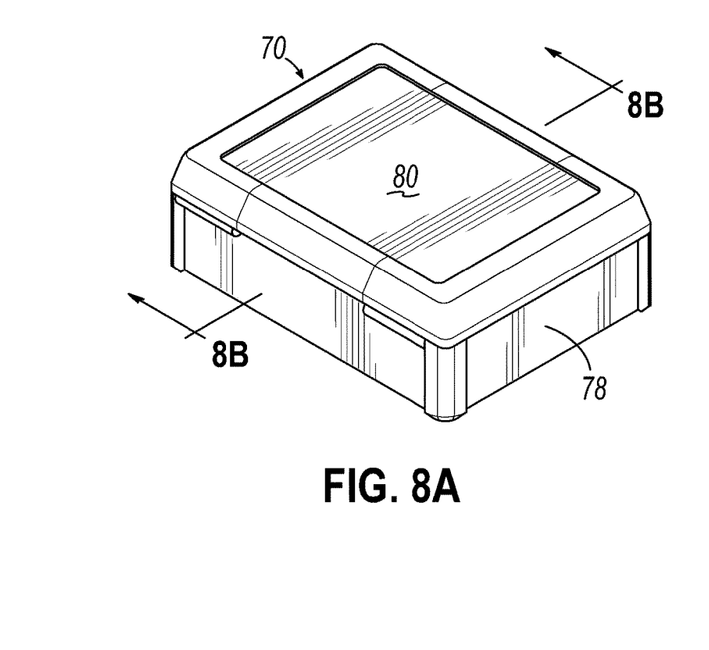
FIGS. 8A-8C are various views of one embodiment of the antenna box to be mounted to the door of the dryer according to this invention.
Figure 8B:
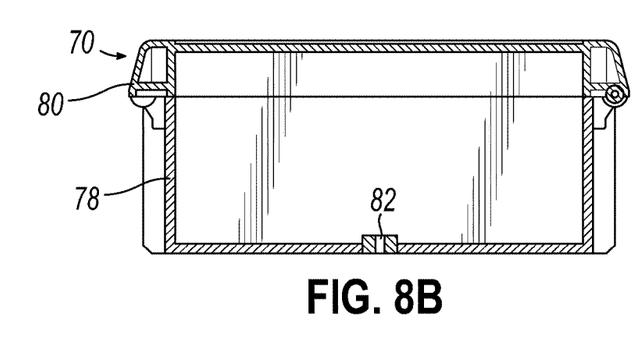
Figure 8C:
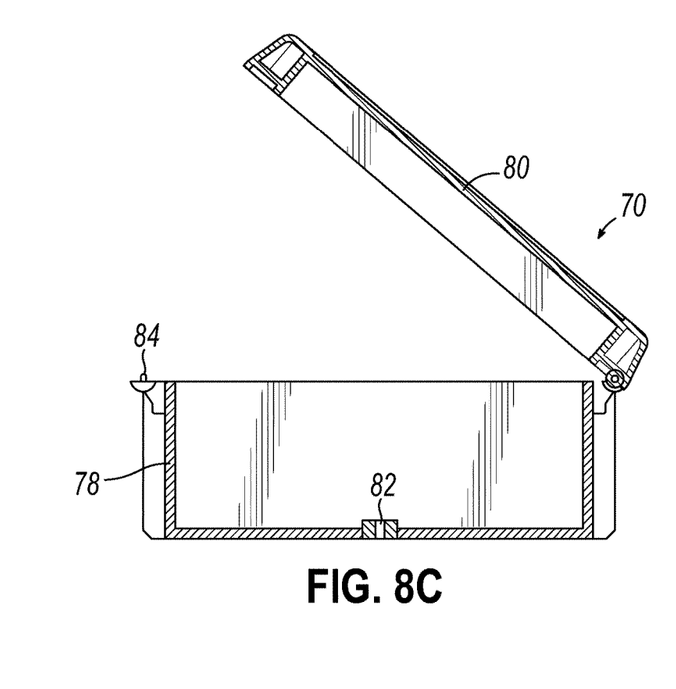

One embodiment of an RFID antenna box 70 for use with various aspects of this invention is shown in FIGS. 8A-8C. The box 70 may be rectangular in shape and having a box body 78 which is selectively closed and opened by a lid 80 hinged to the box body 78 as shown in FIG. 8C. Specific mounting locations 82 are shown for securely mounting the RFID box 70 and RFID antenna 54 contained therein to the door 56 of the dryer 32. The lid 80 may be selectively secured in the closed position on the box body 78 by a clasp, catch or another mechanical device 84.

Figure 7B:
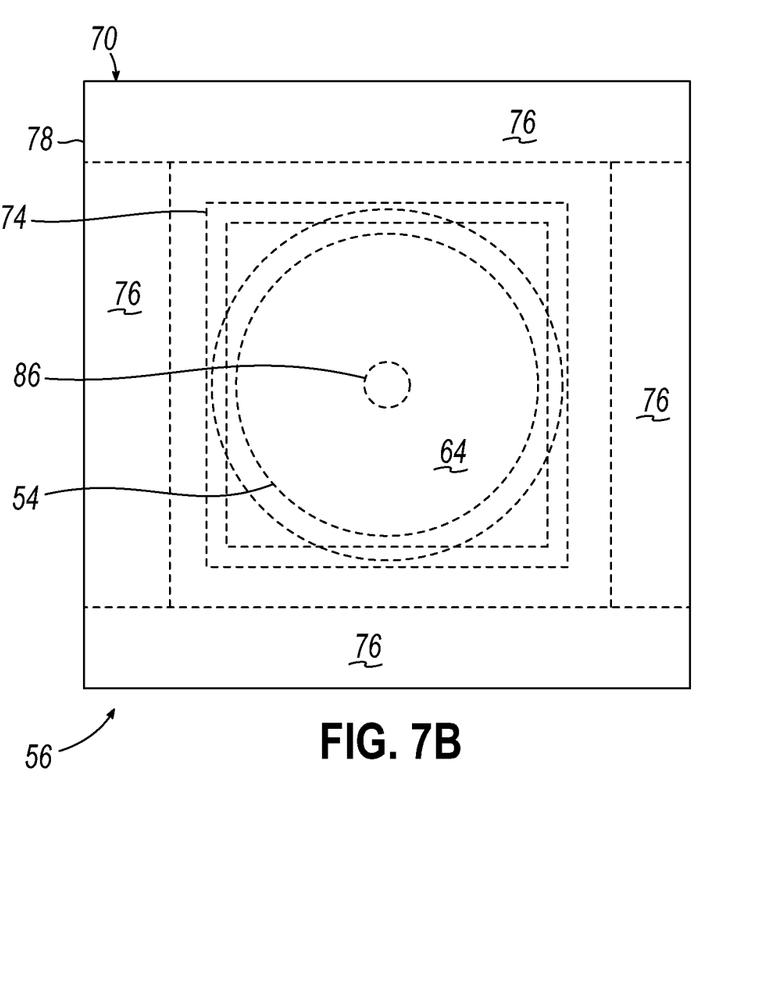

One embodiment of the RFID reader 52 which may be utilized with various aspects of this invention is available from Impinj, Inc. as Speedway® RFID reader available in three different models as Speedway® 420, Speedway® 220 and Speedway® 120. In FIG. 7B, a front elevation view of the installation of FIG. 7A is shown with the antenna box frame 76 being surrounded by the box body 78, one example of which is shown in FIGS. 8A-8C. The RFID antenna frame 74 is contained within the antenna box frame 76. An antenna bolt 86 is utilized to secure the RFID antenna 54 and box 70 to the dryer door 56 which may consist generally of a glass window 64 on the dryer door 56 in the embodiment shown in FIGS. 7A and 7B.

Turning once again to FIG. 1, the system 10 and associated method according to various aspects of this invention may include multiple RFID readers 52 located throughout the system 10 to read the RFID tags 50 on the same garments 14 as they are processed through the system 10 at multiple locations. In one embodiment, three reading locations in the system 10 may be utilized to reduce errors which are inherent in any single reading location. As previously described, one reading location is the drying station 30 with RFID antennas 54 mounted on each of the individual dryers 32. Another RFID reading location may be the folding station 34 at which the garments 14 are tracked, and individual RFID tags 50 are read by an RFID antenna 54 mounted on the folding tables 59, folding conveyor 40 or other appropriate and convenient location without disrupting the folding operation while still providing ready access to the garments 14 and the tags 50 thereon.

Figure 9:
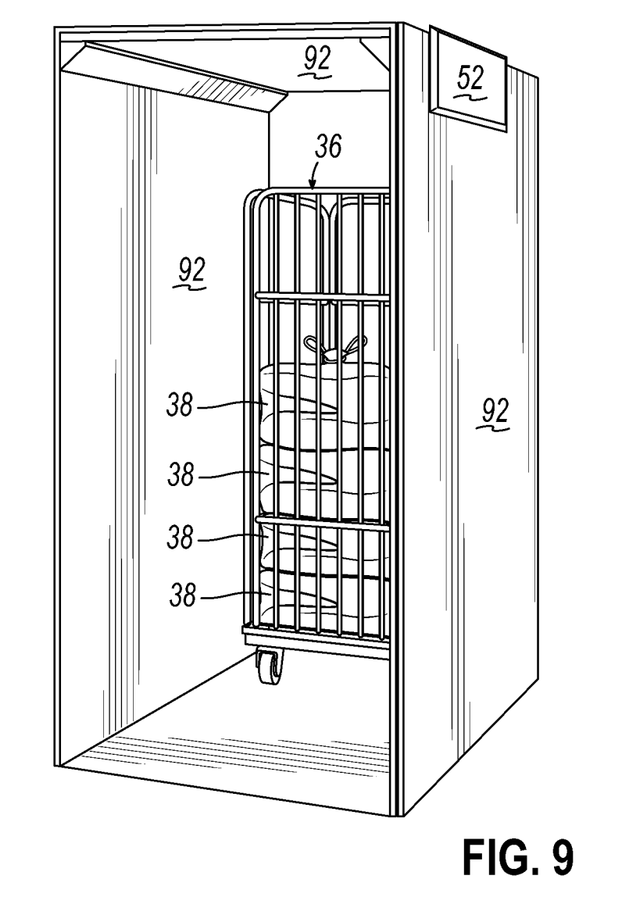
FIG. 9 is perspective view of one embodiment of an RFID reading walk through portal according to this invention.

A third RFID reading location within the system of FIG. 1 may be utilized between the folding and loading stations and specifically within the packing station 42. One embodiment of an RFID reader 52 which may be utilized at this location is shown in FIG. 9 which includes a walkthrough portal 90 as the RFID reading antenna 54. The antenna 54 is incorporated into the structure of the portal 90. The portal 90 includes a generally rectangular and tubular structure 92 through which the folded and packed garments 14 are passed on wheeled bins 36 or other similar vehicles. The inventors of this invention anticipate that roughly 90-95 percent of the tags 50 on the individual garments 14 to pass through the portal 90 will be accurately detected by the RFID reader 52 incorporated into the portal 90.

As will be understood by one of ordinary skill in the art, the data obtained by each of the RFID readers may be collected, transmitted, processed, manipulated and/or evaluated by a central or distributed processing system appropriate for RFID tracking of the textile articles.

Accordingly, according to one aspect of this invention, multiple reading locations are provided throughout the garment processing system 10 for accurately detecting and tracking the individual garments 14 as they are unloaded at the truck unloading station 18, washed, dried, folded and packaged for delivery from the loading dock 46. In one embodiment, three distinct RFID reading locations are provided at or proximate to the drying station 30, folding station 34 and a transition from the packing station 42 to the loading station 44 via the RFID portal 90 of FIG. 9. One RFID reading location may be the RFID portal positioned at the entry to the loading or dispatch station.

From the above disclosure of the general principles of this invention and the preceding detailed description of at least one embodiment, those skilled in the art will readily comprehend the various modifications to which this invention is susceptible. Therefore, we desire to be limited only by the scope of the following claims and equivalents thereof.

We claim:

1. A system for tracking textile articles in a processing facility wherein each of the textile articles has a radio frequency identification (RFID) tag and none of the textile articles is being worn by a wearer, the system comprising:
   a receiving station at which a plurality of the textile articles are received into the system;
   a sorting station at which the plurality of textile articles is sorted;
   a washing station at which each of the plurality of textile articles is washed;
   a drying station at which each of the plurality of textile articles is dried during a drying cycle, the drying station comprising at least one dryer having a doorway through which the plurality of textile articles is received into a drying chamber of the dryer and a door to selectively close and open the doorway;
at least one RFID reader on the at least one dryer to interrogate the RFID tag on each of the plurality of the textile articles while in the drying chamber and throughout the drying cycle;
a folding station at which each of the plurality of textile articles is folded after exiting the drying station; and
a dispatch station at which the plurality of textile articles is dispatched from the system.

2. The system of claim 1 wherein the at least one RFID reader is mounted to the door of the dryer to interrogate the RFID tag on each of the plurality of the textile articles while being dried in the dryer and the door closes the doorway.

3. The system of claim 1 further comprising:
a second RFID reader to interrogate the RFID tag on each of the plurality of the textile articles, the second RFID reader being located proximate to one of the receiving station, the sorting station, the washing station, the folding station and the dispatch station.

4. The system of claim 3 wherein the second RFID reader is located proximate to the folding station.

5. The system of claim 1 further comprising:
a second RFID reader and a third RFID reader, each to interrogate the RFID tag on each of the plurality of the textile articles, the second RFID and third readers each being located proximate to a different one of the receiving station, the sorting station, the washing station, the folding station and the dispatch station.

6. The system of claim 5 wherein the second RFID reader is located proximate to the folding station and the third RFID reader is located proximate to the dispatch station.

7. The system of claim 5 wherein at least one of the second and the third RFID readers further comprises:
a portal through which the plurality of textile articles may pass for interrogation of the RFID tags on the textile articles.

8. The system of claim 1 further comprising:
a packing station intermediate the folding station and the dispatch station at which the plurality of textile articles is assembled into a plurality of bundles.

9. The system of claim 1 wherein the at least one RFID reader is mounted to a non-moving surface of the dryer when the textile articles are being dried.

10. The system of claim 1 wherein the at least one RFID reader reads the RFID tags through a non-opaque surface of the dryer with access to the drying chamber when the textile articles are being dried, the at least one RFID reader being spaced from the non-opaque surface of the dryer.

11. A system for tracking textile articles in a processing facility wherein each of the textile articles has a radio frequency identification (RFID) tag and none of the textile articles is being worn by a wearer, the system comprising:
a receiving station at which a plurality of the textile articles is received by the system;
a sorting station at which the plurality of textile articles is sorted;
a washing station at which each of the plurality of textile articles is washed;
a drying station at which each of the plurality of textile articles is dried during a drying cycle, the drying station comprising at least one dryer having a doorway through which the plurality of textile articles is received into a drying chamber of the dryer and a door to selectively close and open the doorway;
a first RFID reader on the at least one dryer to interrogate the RFID tag on each of the plurality of the textile articles while in the drying chamber and throughout the drying cycle;
a folding station at which each of the plurality of textile articles is folded after exiting the drying station;
a second RFID reader located proximate to the folding station to interrogate the RFID tag on each of the plurality of the textile articles;
a packing station at which the plurality of textile articles is assembled into a plurality of bundles;
a dispatch station at which the plurality of bundles is dispatched from the system; and
a third RFID reader located intermediate the packing station and the dispatch station to interrogate the RFID tag on each of the plurality of textile articles.

12. The system of claim 11 wherein the first RFID reader is mounted to a non-moving surface of the dryer when the textile articles are being dried.

13. The system of claim 12 wherein the first RFID reader reads the RFID tags through a non-opaque portion of the door of the dryer to interrogate the RFID tag on each of the plurality of the textile articles while being dried in the dryer and the door closes the doorway, the at least one RFID reader being spaced from the non-opaque surface of the door.

14. The system of claim 11 wherein the third RFID reader further comprises:
a portal through which the plurality of textile articles pass for interrogation of the RFID tags on the textile articles.

15. A dryer for textile articles in which each textile article has a radio frequency identification (RFID) tag and is not being worn by a wearer, the dryer drying the textile articles during a drying cycle and comprising:
a housing;
a doorway in the housing through which the plurality of textile articles is received into a drying chamber of the dryer;
a door to selectively close and open the doorway; and
an RFID reader on a non-moving portion of the dryer to interrogate the RFID tag on each of the textile articles while in the drying chamber and throughout the drying cycle.

16. The dryer of claim 15 wherein the RFID reader is mounted to a non-opaque portion of the door of the dryer to interrogate the RFID tag on each of the textile articles while being dried in the dryer and the door closes the doorway.

17. A method of tracking a plurality of textile articles each having a radio frequency identification (RFID) tag and none of the textile articles is being worn by a wearer, the method comprising the steps of:
receiving the plurality of textile articles at a receiving station;
sorting the plurality of textile articles at a sorting station;
washing the plurality of textile articles at a washing station;
drying each of the textile articles during a drying cycle and in at least one dryer having a drying chamber and a doorway accessing the drying chamber, the doorway being selectively closed and opened by a door mounted on the dryer;
interrogating each of the RFID tags of the plurality of textile articles while in the drying chamber and throughout the drying cycle;
folding each of the plurality of textile articles at a folding station; and dispatching the plurality of textile articles from a dispatch station.

18. The method of claim 17 wherein the interrogating step further comprises interrogating each of the RFID tags through the door of the at least one dryer with an RFID reader spaced from the door.

19. The method of claim 17 further comprising:
packing the plurality of textile articles into a plurality of bundles after the folding step.

20. The method of claim 19 further comprising:
interrogating each of the RFID tags of the plurality of textile articles while at the folding station; and
interrogating each of the RFID tags after the packing step and prior to the dispatching step.

\* \* \* \* \*